United States Patent Office

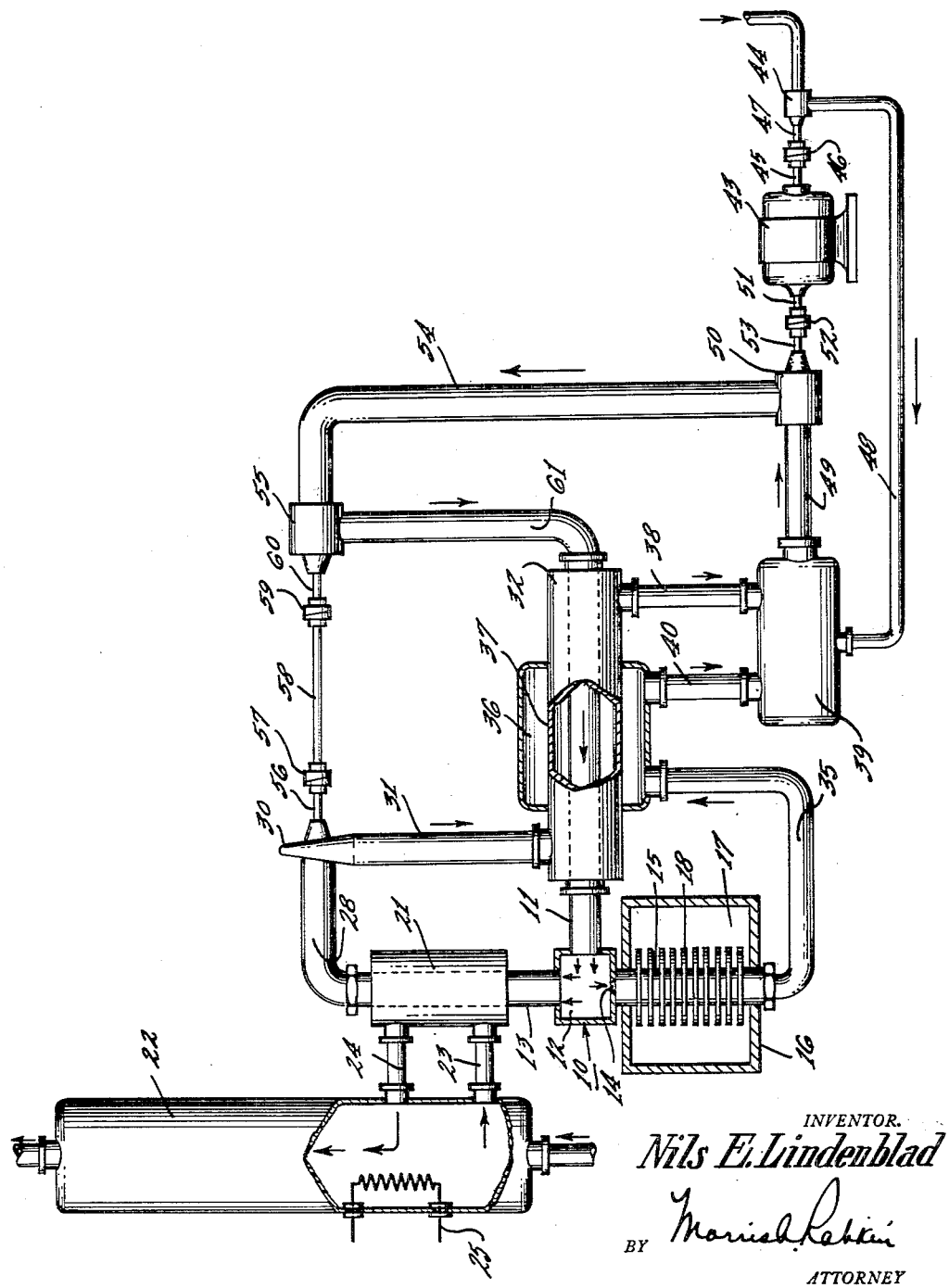

2,698,525
Patented Jan. 4, 1955

2,698,525

REFRIGERATION ARRANGEMENT UTILIZING THE RANQUE TUBE

Nils Eric Lindenblad, Princeton, N. J., assignor to Radio Corporation of America, a corporation of Delaware Application August 17, 1953, Serial No. 374,640

6 Claims. (Cl. 62—136)

The invention relates to a refrigeration arrangement utilizing the Ranque-Hilsch vortex tube, and more particularly to an arrangement utilizing the Ranque-Hilsch vortex tube which utilizes the exhaust products to increase the overall efficiency of operation. The Ranque-Hilsch vortex tube breaks up a moving gas stream into two opposite flowing branches, one cold and one hot.

A gas or vapor under pressure enters the vortex tube through a tangential entry orifice producing a vortex in a precision configured internal chamber.

Within the vortex the gas is broken up into gyrating coaxial layers. The hotter outer layers travel in a helical path toward one end of the tube. The exit at that end is restricted to produce a backpressure which forces the cooler gas located in the center of the vortex through a centrally located orifice out the opposite end of the tube. The restricted arm of the tube, becomes hot due to the withdrawal of the cooler slow moving molecules through the other arm of the tube which becomes cool. The temperature division is dependent upon the degree of throttling of the hot exit tube.

By experiment it has been found that maximum temperature difference is attained with the flow regulated to a division of approximately 70 per cent hot and 30 per cent cold. Since these tubes are relatively inefficient in terms of conventional refrigerating practice, they have been suggested for use up to the present mainly for cooling electronic equipment where simplicity and convenience is a major consideration.

An object of this invention is to provide an arrangement where the energy in the exhaust of the vortex tube can be used to perform useful functions in order to increase the efficiency of operation of the vortex tube as a refrigerating device.

A further object of this invention is to provide an arrangement whereby the hot and cool exhaust from the vortex tube can be used in heating and pre-cooling to increase the efficiency of the vortex tube as a cooling device.

A further object of this invention is to provide an arrangement where a vortex tube can be utilized for heating and cooling in an efficient installation.

To improve the efficiency of the vortex tube, the waste energies present in the hot and cold exhaust are used to perform useful functions. The hot exhaust instead of being allowed to pass off to the atmosphere, is passed within heating tubes immersed in a water tank. This waste heat is therefore used to help supply hot water. Although another heating element will be necessary to provide a continuous hot water supply, while the tube is operating it will aid greatly in heating the water. The throttling valve usually found in the exit of the hot tube is eliminated. To furnish the necessary throttling, a gas driven motor is provided. The motor has two functions. It restricts the hot discharge and cools the hot exhaust. In addition it drives a booster blower which aids in supplying a primary flow of compressed gas such as, for example, compressed air to the tangential chamber. After performing work in passing through the motor, the cooled exhaust is used to cool the input air to the vortex tube. The exhaust from the cool end of the vortex tube is mixed with the cool exhaust from the air-driven motor to reduce the temperature of the inlet air to the vortex tube.

The flow of hot and cold air which formerly was allowed to pass off as waste exhaust to the atmosphere provides energy to drive blowers and precools the air entering the tube. Operation of the vortex tube as a refrigerator is therefore greatly increased in efficiency.

A further understanding will be gained and obvious modifications will be apparent to one skilled in the art from a study of the following detailed description in conjunction with the single figure of the drawing which is a diagrammatic view of an arrangement of this invention.

A vortex tube 10 is connected in circuit with various heat exchange units which recover the energy in the discharged hot and cold streams to increase the overall operation of the vortex tube as a refrigerating device. The function of the various parts of the circuit can be best described by tracing the passage of a flow of a compressed gas, such as, for example, compressed air through the vortex tube and through the various pieces of heat exchange apparatus.

Air enters the vortex tube 10 through the inlet tube 11. Within the vortex chamber 12 the air is broken up into gyrating coaxial layers. The hotter outer layers travel in a helical path toward the tube at one end of the vortex chamber. The back pressure created in the hot exit tube 13 forces the cooler gas located in the center of the vortex chamber 12 through the orifice 14 into the cool exit tube 15. The cool exit tube 15 passes through a chamber 17 surrounded by insulated walls 16 of an insulating material such as fiber glass. The cooler air absorbs heat through the surface of the cool exit tube 15 and a number of cooling fins 18 from the interior of this chamber. A cooled or refrigerated chamber 17 is therefore provided.

The hot exhaust tube first passes through a heat exchanger 21. Water from a heating tank 22 passes through pipe 23 into the heat exchanger 21. Within the heat exchanger 21, the water surrounds the outer surface of the hot exhaust tube 13. The heated water flows out of pipe 24 back into the tank 22. A steady flow of water therefore circulates through the jacket 21 where it is heated thereby cooling the hot exhaust gas from the vortex tube to a considerable extent. Electrical heating element 25 is provided within the tank 22 to heat water during periods where the vortex tube is shut off in order to supply hot service water. A heating element of any type if desired may be used instead of the electrical element.

When leaving the heat exchanger, the cooled air which is still warm enters the air motor 30 through pipe 28. The air motor has two functions. It throttles the hot exhaust to provide a back pressure which forces the cool exhaust through the centrally located orifice. The air motor also cools the exhaust still further. An air motor of the well known types of air driven motors which are commonly known may be used. The cool exhaust from the air motor flows through the pipe 31 to the heat exchange unit 32.

At the same time the cold air in the cool exhaust tube, after flowing through the insulated chamber 17 where it has absorbed a considerable amount of heat passes through pipe 35 into the heat exchange jacket 36 which surrounds the unit 32. The cool exhaust further cools the exhaust from the hot end through the wall 37 of heat exchanger 32.

The hot end exhaust then passes through pipe 38 into mixing chamber 39 while the cool exhaust passes from chamber 36 through pipe 40 into mixing chamber 39.

The double ended motor 43 from one end drives the compressor 44 through shaft 45, coupling 46 and shaft 47 which supplies compressed air in makeup quantity through the pipe 48 to the mixing chamber 39. The mixture from the chamber 39 flows through pipe 49 into the primary pusher blower 50. This blower is driven by the other end of the motor 43 through shaft 51, coupling 52 and shaft 53. The mixture of exhaust and makeup compressed air is forced through pipe 54 into the secondary booster blower 55. This secondary booster blower is driven through shaft 56, coupling 57, shaft 58, coupling 59 and shaft 60 by the energy developed in the air-driven motor 30. The air-driven motor therefore not only throttles and cools the hot end exhaust but also aids in delivering the mixture of compressed air to the inlet of the vortex tube. On leaving the secondary booster blower 55, the mixture of exhaust and fresh recompressed air flows through pipe 61 which passes through the center of heat exchange chamber 32. The inlet air is therefore precooled by the exhaust from air motor 30 which passes through heat exchanger 32. The cool exhaust chamber 36 cools the air-driven motor exhaust 32 still further so that a maximum of the cooling capacity of exhaust gases is utilized to precool the inlet air to the vortex chamber 12.

To summarize, the vortex tube 10 which is primarily used to cool the insulated chamber 17 is connected to a circuit which recovers and utilizes the cooling capacity of the cool exhaust to precool the inlet mixture. The thermal energy in the hot exhaust is utilized to heat hot water. Kinetic energy in the hot exhaust is used to drive an air-driven motor which throttles the hot exhaust providing the necessary back pressure for proper operation of the vortex tube and further cooling the hot exhaust gas. This cool hot exhaust gas when it reaches equilibrium heat exchange relationship with the cool end exhaust is used to help precool the inlet gas to the vortex tube. The hot and cool end exhaust gases are combined at the end of the circuit and recirculated to the inlet of the system replenished by fresh compressed air to provide an initially cool mixture to be supplied to the inlet of the vortex tube. The energy provided by the work performed in the air-driven motor is used to drive a secondary booster blower to further help compress the stream of air supplied to the inlet of the vortex chamber. By recovering the waste energies in the exhaust gases, a more highly efficient utilization of the Hilsch tube as a refrigerating device is obtained.

What is claimed is:

1. An arrangement for increasing the efficiency of the Ranque-Hilsch vortex tube comprising means for applying gas under pressure to said tube, a heat exchanger for absorbing the heat contained in the hot exhaust from said tube, a gas-driven motor, means whereby said motor is driven by the hot exhaust from said tube, means for cooling the hot exhaust, and a further heat exchanger for combining the cooled hot exhaust from the motor and the cool exhaust from the cool end of the tube to precool the pressurized gas supplied to the inlet chamber of the vortex tube.

2. The combination set forth in claim 1 wherein a secondary booster blower which aids in delivering pressurized air to the inlet of the vortex tube is provided to utilize the energy provided by the hot exhaust gas driven motor.

3. In an energy-recovering flow circuit for efficient operation of a Ranque-Hilsch vortex tube the method of operation comprising passing the hot exhaust into the tubes of a water heater to heat the water, passing the exhaust from the heater tubes through a gas-driven motor whereby the gas is cooled by doing work in the motor, passing the further cooled exhaust through passages contacting in heat exchange relationship the gas supplied to the vortex tube precooling said entering gas, and recirculating the cool gas together with additional pressurized gas to deliver a precooled supply of gas to the inlet tube.

4. The method set forth in claim 3 wherein the energy provided by the gas-driven motor drives a booster-blower which aids in pressurizing the gas supplied to the inlet of the vortex tube.

5. An arrangement for recovering waste energy to increase efficiency of operation of a Ranque-Hilsch vortex tube comprising a heat exchanger for absorbing heat in the hot exhaust, a gas-driven motor driven by the hot exhaust throttling and cooling the hot exhaust flow, means to increase surface area placed about end of the tube to more efficiently absorb heat from the surrounding area, heat exchange passages for the flow of the cool tube exhaust whereby the pressurized inlet gas to the Ranque-Hilsch tube is precooled, a mixing chamber combining the cooled exhaust from the hot end of the tube and the cool exhaust from the cool end of the tube, and conduit means attached to said mixing chamber whereby the mixed cool gases are joined with a flow of pressurized gas supplied to the inlet of the vortex tube precooling the gases entering the tube.

6. The combination set forth in claim 5 wherein secondary blower means are provided to further pressurize the inlet air, said blower being driven by the energy provided by the gas-driven motor which is driven by the exhaust from the hot end of the tube.

References Cited in the file of this patent

UNITED STATES PATENTS

| 1,952,281 | Ranque | Mar. 27, 1934 |
| 2,581,168 | Bramley | Jan. 1, 1952 |
| 2,644,315 | Jamieson | July 7, 1953 |